United States Patent [19]

Davis et al.

[11] Patent Number: 4,828,187
[45] Date of Patent: May 9, 1989

[54] PARTICULATE SEPARATION CHAMBER AND BAG DISPOSAL MEANS IN A NEGATIVE PRESSURE SYSTEM FOR COLLECTION OF HAZARDOUS MATERIAL

[75] Inventors: Charles Davis; Robert Kennedy, both of Avenel, N.J.

[73] Assignee: Aaxon Industrial, Inc., Avenel, N.J.

[21] Appl. No.: 70,173

[22] Filed: Jul. 6, 1987

[51] Int. Cl.$^4$ .............................................. B02C 7/00
[52] U.S. Cl. .......................................... 241/24; 55/1;
55/429; 55/356; 55/315; 220/404; 383/41;
383/904
[58] Field of Search ................. 55/1, 84, 97, 315, 356,
55/428, 429; 220/403, 404; 141/7, 10, 59, 114,
313; 209/143; 383/41, 904; 241/24

[56] References Cited

U.S. PATENT DOCUMENTS

| 983,882 | 2/1911 | Dwyer | 55/364 |
| 1,484,208 | 2/1924 | Davis | 209/142 |
| 1,651,372 | 12/1927 | Carline | 209/143 |
| 2,009,251 | 7/1935 | Edgar | 55/84 |
| 2,384,709 | 9/1945 | Thoren | 220/404 |
| 4,061,480 | 12/1977 | Frye et al. | 55/356 |
| 4,211,266 | 7/1980 | Massey | 383/41 |
| 4,467,494 | 8/1984 | Jones | 55/379 |
| 4,531,258 | 7/1985 | Spellman | 55/429 |
| 4,604,111 | 8/1986 | Natale | 55/97 |
| 4,718,925 | 1/1988 | DeMarco | 55/429 |

FOREIGN PATENT DOCUMENTS 720421 12/1954 United Kingdom ................. 55/315

Primary Examiner—Bernard Nozick
Attorney, Agent, or Firm—Clifford G. Frayne

[57] ABSTRACT

A separation chamber comprising a solid walled container vessel having a removably sealable top which contains an inlet port, the chamber having an inner perforated screen wall with an outlet port positioned in the side of the vessel extending into the interior of the perforated screen inner wall, a static vacuum line communicating with the outlet line and the annular space between the solid outer container wall and the inner perforated screen wall, and a self-contained disposal bag having an inlet sleeve and an outlet sleeve, said bag design to conform to the contours of the inner perforated screen wall and said inlet sleeve for extending through the inlet port and the outlet sleeve for extending outwardly through said outlet port, both sleeves having a means for securing the sleeves in a closed and secure position once the disposal bag has become filled with particulate matter, the bag, complying with disposal requirements, then being deposited in an appropriate disposal area.

8 Claims, 3 Drawing Sheets

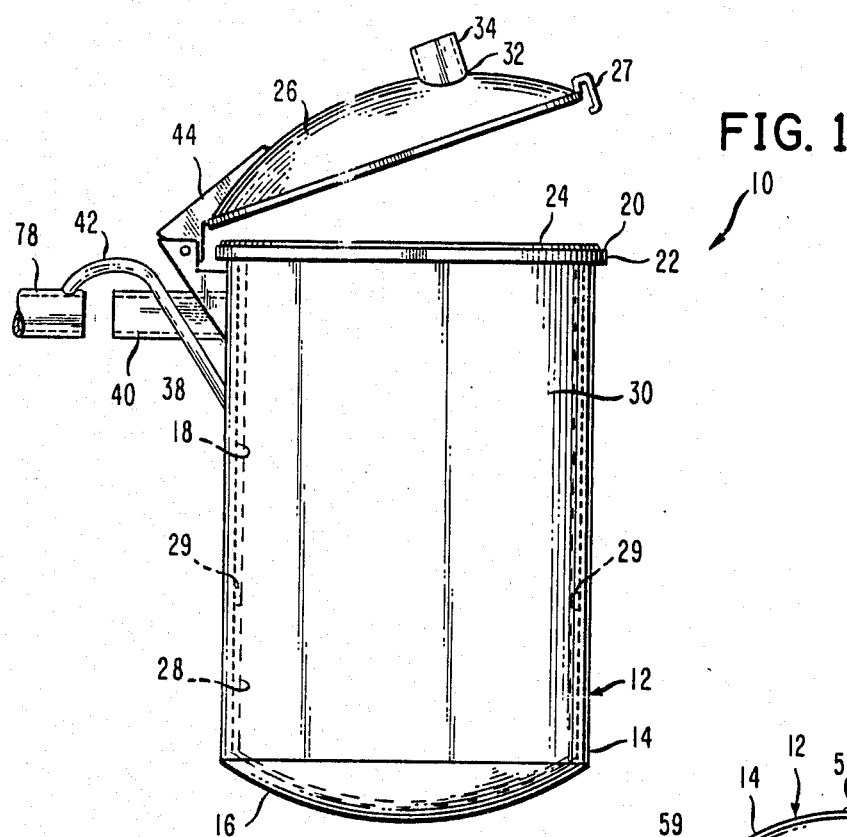
FIG. 1
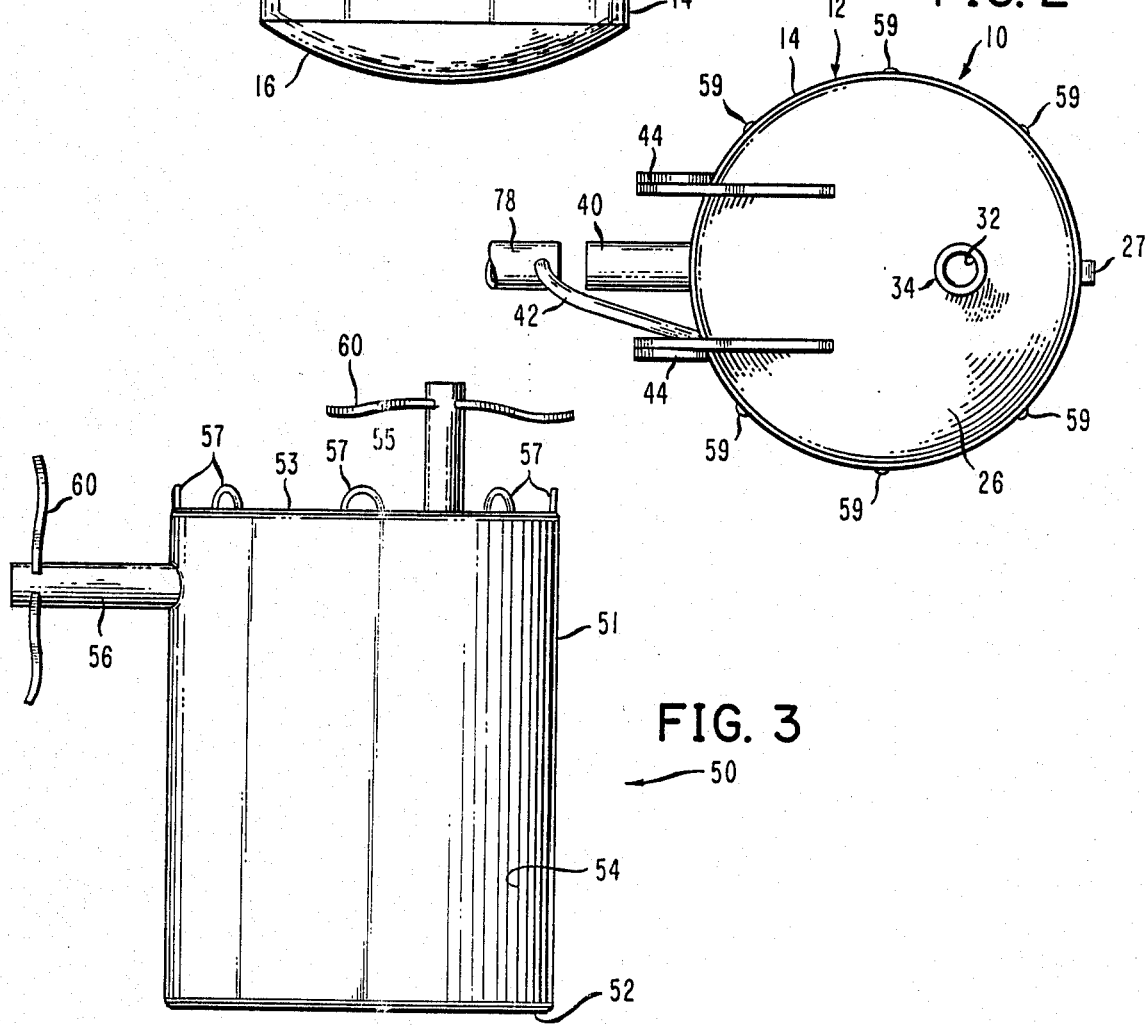
FIG. 2
FIG. 3

PARTICULATE SEPARATION CHAMBER AND BAG DISPOSAL MEANS IN A NEGATIVE PRESSURE SYSTEM FOR COLLECTION OF HAZARDOUS MATERIAL

FIELD OF INVENTION

This invention relates to a separation chamber and bag collection means for the collection and removal of hazardous or toxic material in a particulate form such as asbestos and the like.

BACKGROUND OF THE INVENTION

Vacuuming apparatus for particulate matter are well known and quite developed in the prior art. However, with the emphasis on environmental quality in the cleanup of hazardous waste, new and improved methods are required in order to ensure that particular hazardous waste in the form of particulate matter are removed from the environment and in the course of removal are not permitted to escape into the atmosphere.

With particular emphasis on the asbestos industry, the Applicant developed a negative pressure filtration system in order to attain an asbestos removal level of 0.3 microns in accordance with regulations promulgated by environmental agencies. U.S. Pat. No. 4,490,162. Applicant's prior patent was directed toward achieving the removal of minute particulate matter in the airstream. As described in Applicant's prior U.S. Patent, the heavier particulate matter was collected under the force of gravity in a first collection chamber which was then emptied into disposable containers.

More recent regulations with respect to the collection and disposal of asbestos waste and other hazardous waste, relate to the collection of the particulate waste and its disposal in landfills. These requirements and regulations relate to the packaging of the hazardous waste with no visible discharge for disposal and the amount of available space in existing landfills dedicated for this hazardous waste. It has therefore become a prime concern for removal contractors to compact the larger particulate matter in an economical and efficient manner while still maintaining the efficiency of the collection system and the integrity of the collection system to prevent the escape of particulate matter into the ambient atmosphere. Further environmental requirements call for the wetting of the hazardous material. (40 CFR 61.151).

Applicant's present invention continues to utilize Applicant's negative pressure concept with an initial separation chamber and novel bag system, which collects and compresses the heavier particulate matter in a uniquely designed bag system, the integrity of the bag system being secured when full to prevent the escape of hazardous waste to the ambient atmosphere and at the same time complying with requirements for landfill disposal in an efficient and economical manner. Additionally, Applicant's apparatus and process reduces the manpower required and thus reduces human exposure to the hazardous material.

OBJECTS OF THE INVENTION

It is the primary objective of the present invention to provide a novel and improved separation chamber for the collection of particulate matter.

It is yet a further effect of the present invention to provide a novel separation chamber which collects and compresses the particulate matter as a result of the negative pressure of the flow stream.

It is still a further object of the present invention to provide a novel separation chamber in combination with a novel bag design to secure the integrity of the collected particulate matter and prevent its discharge into the ambient atmosphere.

It is still a further object of the present invention to provide a novel separation chamber in combination with a novel bag design to ensure the collection of particulate matter in a compressed state for disposal.

It is still a further object of the present invention to provide a novel process for the collection and disposal of particulate matter.

SUMMARY OF THE INVENTION

A separation chamber comprising a solid walled container vessel having a removably sealable top which contains an inlet port, the chamber having an inner perforated screen wall with an outlet port positioned in the side of the vessel extending into the interior of the perforated screen inner wall, a static vacuum line communicating with the outlet line and the annular space between the solid outer container wall and the inner perforated screen wall, and a self-contained disposal bag having an inlet sleeve and an outlet sleeve, said bag design to conform to the contours of the inner perforated screen wall and said inlet sleeve for extending through the inlet port and the outlet sleeve for extending outwardly through said outlet port, both sleeves having a means for securing the sleeves in a closed and secure position once the disposal bag has become filled with particulate matter, the bag, complying with disposal requirements, then being deposited in an appropriate disposal area.

BRIEF DESCRIPTION OF THE DRAWINGS

These and other objects of the present invention as well as the novel features thereof, will become more apparent by reference to the following description particularly when taken in conjunction with the accompanying figures in which:

FIG. 1 is a side elevational view of the container vessel;

FIG. 2 is a top planer view of the container vessel;

FIG. 3 is a side view of the disposal bag;

DETAILED DESCRIPTION OF THE DRAWINGS

Figure 4:
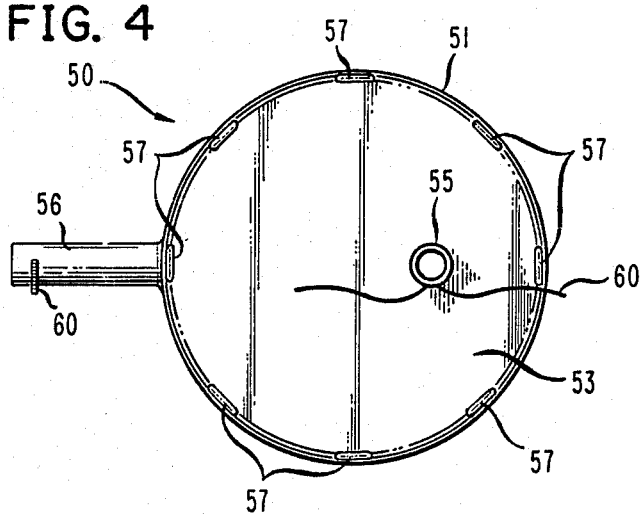
FIG. 4 is a top view of the disposal bag.

Referring to FIG. 1, this is a side elevational view of separation chamber 10. Separation chamber 10 comprises a container vessel 12 having a solid impervious sidewall 14, a lower solid, impervious end portion 16 secured to the sidewall, defining an inner chamber 18. Lower end portion 16 is slightly concave from inner chamber 18. Upper end 20 of separation chamber 10 is open and has an annular flange 22 about said opening for receipt of a sealing gasket 24. Sealing gasket 24 cooperatues with lid 26 for effectuating a closure seal when lid 26 is secured to separation chamber 10 in a closed position by means of locking lever 27. Lid 26 is also designed to be slightly concave outwardly from the inner chamber 18.

There is secured within separation chamber 10, an inner wall comprising a perforated screen 28 which substantially conforms to the inner dimensions of separation chamber 10 and provides an annular space 30, between sidewall 14 and perforated screen 28 and a cavity between lower end portion 16 of separation chamber 10 and perforated screen 28. Perforated screen 28 is secured within separation chamber 10 by means of a plurality of securing mounts 29 which maintain the positioning of perforated screen 28 in relationship to sidewall 14 and lower end portion 16.

An inlet port 32 is formed in lid 26 and has secured thereto, a vertical inlet conduit 34. An outlet port 36 is formed in sidewall 14 coincidental with an outlet port 38 in perforated screen 28 and there is secured thereto, a horizontal outlet conduit 40, the end of which terminates at perforated screen 28.

A vacuum conduit 42 as will be more particularly described thereafter, communicates between annular gap 30 of separation chamber 10 and the outlet line attached to outlet conduit 40.

Referring to FIG. 2, there is shown a top planer view of the separation chamber showing lid 26, inlet port 32 and inlet conduit 34 and outlet conduit 40 and vacuum conduit 42. In this view, lid 26 has effectuated a seal about annular flange 22 and sealing gasket 24. Further, in this configuration, it can be seen that lid 26 is secured to separation chamber 10 by means of a pair of hinge mechanisms 44, one end of the hinge mechanism secured to sidewall 14 and the second hinge member secured to lid 26. This permits lid to be rotated between an open position as shown in FIG. 1 and to a closed position as shown in FIG. 2 and secured by locking lever 27.

Referring to FIG. 3, there is shown a side elevational view of the disposal bag 50. Disposal bag 50 in this configuration is constructed of polypropylene of a strength of Disposal bag 50 comprises a sidewall 51, a lower 6½ mil. Disposal bag 50 comprises a sidewall 51, a lower end 52 secured to sidewall 51 and an upper end 53 secured to sidewall 51. Sidewall 51 and lower end 56 and upper end 53 define an inner chamber 54. In this embodiment, upper end 53 has an inlet sleeve 55 secured thereto and in communication with inner chamber 54 and sidewall 51 has an outlet sleeve 56 secured thereto, also communicating with inner chamber 54.

Disposal bag 50 is designed to be inserted into separation chamber 10 with an inlet sleeve 55 being coincidental with inlet port 32 and inlet conduit 34 and outlet sleeve 56 being coincidental with outlet port 38 and outlet conduit 40. In this configuration, sleeves 55 and 56 respectively are pulled through the respective inlet and outlet conduits and lid 26 would then be secured to separation chamber 10. Sleeves 55 and 56 would then be rolled back upon the respective inlet and outlet conduit and these conduits would then be secured to extension conduits leading to the area where the particular matter is being removed and from the outlet conduit to the additional separation means achieving 3 micron particulate filtration.

Disposal bag 50 has disposed about upper end 53 a plurality of U-shaped straps 57 which overlap sidewall 14 at upper end 20 and are secured to a plurality of securing hooks 59 disposed about the exterior of sidewall 14. In this manner, disposal bag 50 is maintained in position within separation chamber 10 while inlet sleeve 55 and outlet sleeve 56 are positioned.

As will be discussed hereafter, disposal bag 50 may be removed from chamber 10 by a variety of means; however, the plurality of U-shaped straps 57 will permit the vertical lifting of disposal bag 50 from chamber 10.

U-shaped straps 57 which overlap sidewall 14 are of such a thickness so as not to interfere with the closure of lid 26 and as such, do not interfere with the seal between lid 26, sealing gasket 24 and container vessel 12.

It will be noted with reference to FIGS. 3 and 4, that inlet sleeve 55 and outlet sleeve 56 has secured thereto, tie off strings 60 for securing inlet sleeve 55 and outlet sleeve 56 in a closed position after disposal bag 50 has been filled.

Figure 5:
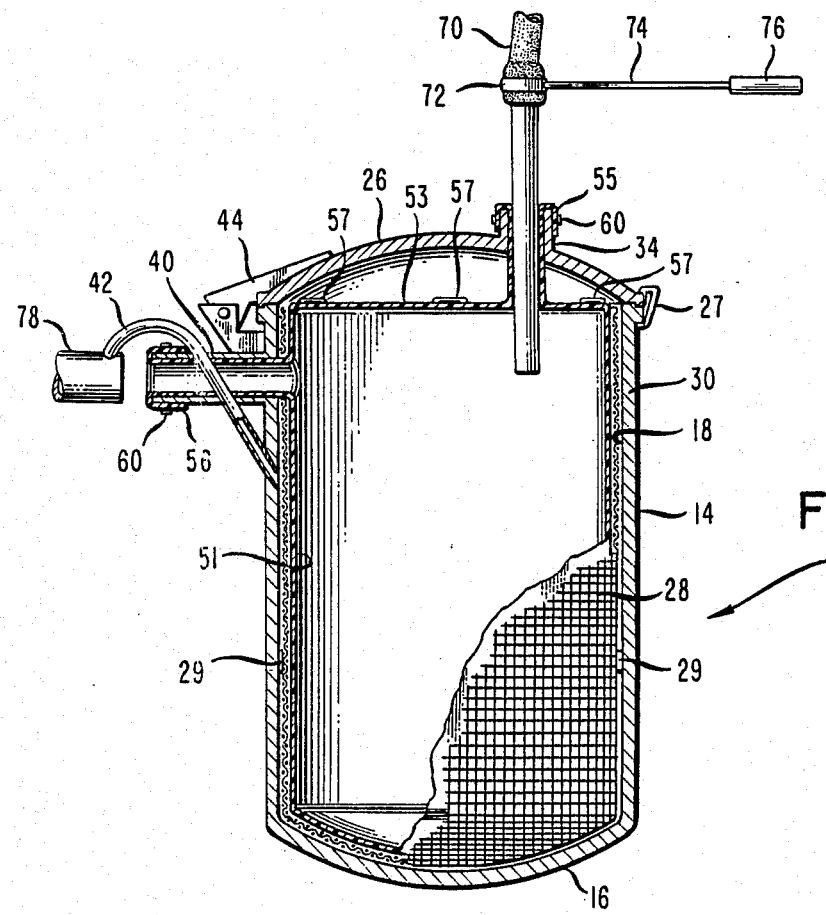
FIG. 5 is a side elevational, cutaway view along plane A—A of FIGS. 2 and 4 of the container vessel containing the disposal bag.

The present embodiment of disposal bag 50 in cooperation with separation chamber 12 is shown in FIG. 5 which is a cutaway side elevational view of separation chamber 12 along plane A—A of FIG. 2 and disposal bag 50 along plane A—A of FIG. 4. In this configuration, describing the loading procedure, lid 26 has been rotated to an open position and disposal bag 50 has been positioned within container vessel 12. U-shaped straps 57 have been extended over securing hooks 59 to maintain disposal bag 50 in a substantially upright position. Outlet sleeve 56 has been extended through outlet port 38 and outlet conduit 40 and is of such a length to permit outlet sleeve 56 to be folded back over the exterior circumference of outlet conduit 40. Inlet sleeve 55 is in alignment with inlet port 32 in lid 26 and inlet conduit 34 such that inlet sleeve 55 is extended upwardly through inlet port 32 and inlet conduit 34 and again, is of such a length to permit inlet sleeve 55 to be folded backward back along the outer circumference of inlet conduit 34. In this manner, lid 26 is lowered into position with sealing gasket 12 and locking lever 27 secures lid 26 to container vessel 12.

Inlet conduit 34 is then secured to inlet piping 70 which inlet piping 70 is in communication with a grinder or pulverizer means proximate to the location where hazardous material or asbestos is being removed or vacuumed. This location may be within several dozen feet of the separation chamber or in the case of asbestos removal from large buildings, the location of the vacuuming or pulverizing process may be several hundred or a thousand feet away. Located in the inlet piping to separation chamber 10 is a wetting collar 72. Wetting collar 72 consists of an annular or doughnut shaped ring positioned in the inlet pipe so as not to interfere with the gaseous airstream and particulate matter and is secured so as to maintain the integrity of the inlet piping. The wetting ring 70 comprises a plurality of radially-spaced orifices which permit the injection of water or other encapsulant into the gaseous airstream in order to wet the particulate matter. The wetting collars are fed by a conduit means 74 connected to a pump 76 and water supply source.

Inlet piping 70 is secured to inlet conduit 34 in order to ensure that no particulate matter in the gaseous airstream can vent to the ambient atmosphere. Additionally, depending upon the size and density of the particulate matter it is sometimes advisable to have the inlet conduit 70 extend within inlet conduit 34 of lid 26 in order that the inlet conduit can serve as protection for inlet sleeve 55. In this manner, inlet sleeve 55 will not be subjected to frictional abrasion from the particulate matter in the gaseous airstream.

Figure 6:
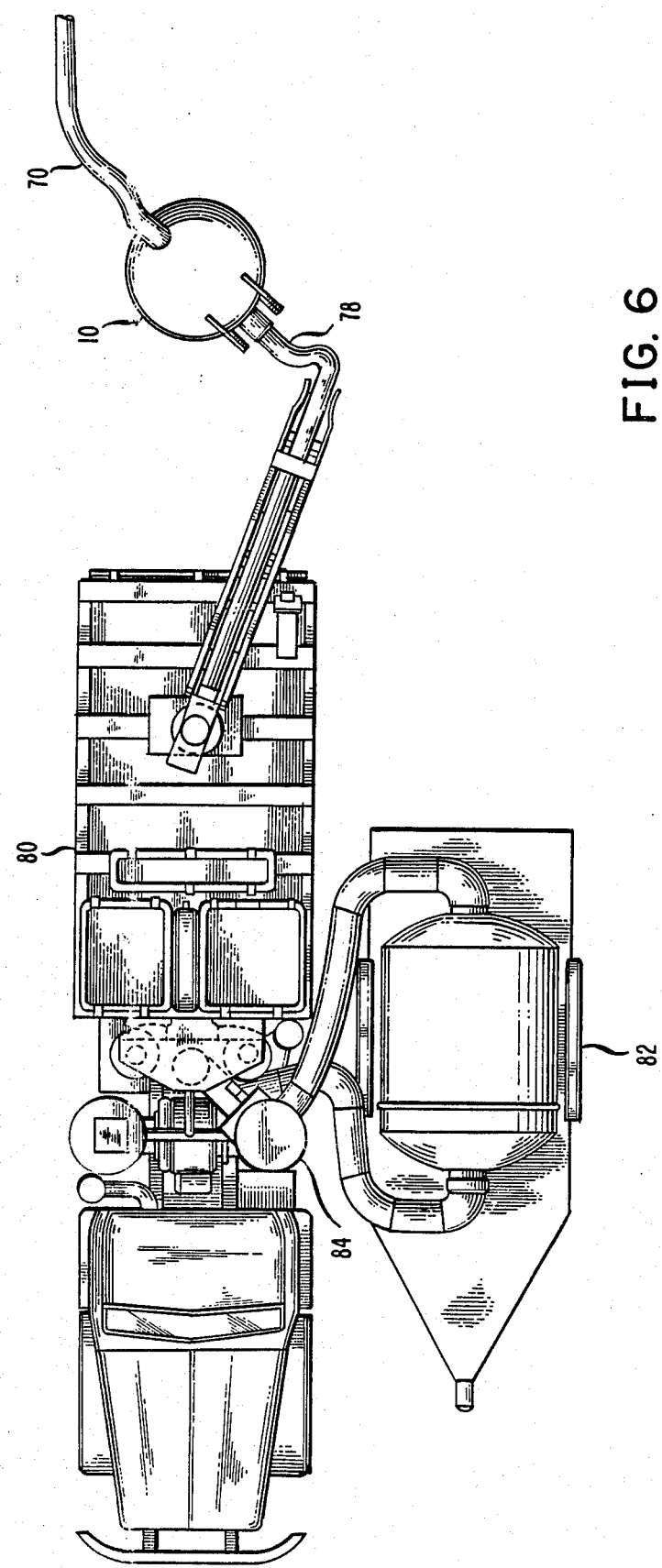
FIG. 6 is a top planer view of the container vessel in cooperation with the overall process.

Similarly, outlet conduit 40 would be secured to outlet piping 78 which as will be described hereafter with reference to FIG. 6, is in communication with downstream filtration devices for the filtration of minute particles and is also in communication with the vacuum source.

With reference to FIG. 6, separation chamber 10 can be seen in the overall flow process. Outlet piping 78 is secured to a vacuum truck 80 which subjects the gaseous airstream to a second gravitational settling chamber 10 and then in succession, to a series of bag filters, centrifugal separators, and ultimately to a Hepa filtration unit 82 which filters the gaseous airstream and particulate matter to the 0.3 micron level. Positioned after the Hepa filtration unit 82, is the vacuum pump 84 which maintains the overall system under negative pressure.

In start-up operation, the vacuum pump 84 would commence operation creating a negative pressure throughout the system, the input being the vacuum nozzle or pulverizer at the extreme terminus of inlet piping 70. The commencement of gaseous airflow through separation chamber 10, expands disposal bag 50 against perforated screen 28. Perforated screen 28 maintains disposal bag 50 in a substantially expanded form and at the same time, prevents disposal bag 50 from being sucked from internal chamber 18 into outlet conduit 40.

The gaseous airstream under negative pressure in inlet conduit 70 decreases slightly in negative pressure upon its entrance into inner chamber 18 of container vessel 12 and negative pressure increases upon its exit through outlet conduit 78. Vacuum conduit 42 which communicates between outlet conduit 78 and annular space 30 permits annular space 30 to be subjected to the negative pressure in outlet conduit 78 due to the velocity of the gaseous airstream, thus creating a pressure differential in container vessel 12 between the gaseous airstream in disposal bag 50 and annular space 30 thereby contributing to the expansion of disposal bag 50 and its maintenance in a substantially expanded state.

The process proceeds in the aforementioned manner until disposal bag 50 is filled by the gravitational settling of particulate matter from the airstream. At that point in time, liquid flow to the wetting collars ceases and the feeding of particulate matter into inlet conduit 70 is ceased. Vacuum pump 84 continues operation in order to purge inlet conduit 70. At that time, inlet piping 70 is disconnected from inlet conduit 34 on lid 26. Since vacuum pump 84 continues to operate, there is no reverse airflow from internal chamber 18, up inlet port 34. The operator would unfurl inlet sleeve 55 from inlet conduit 34 and utilizing tie-off straps 60, quickly spindle inlet sleeve 55 and secure this closure by tying tie-off strings 60 in a secure manner. The same process would occur with respect to the removal of outlet piping 78 from outlet conduit 40 of separation chamber 10. However, in the removal of outlet piping 78, it would be kept in close proximity to outlet conduit 40 while the operator spindled and tied outlet sleeve 56 in order to ensure that any particulate matter exiting outlet conduit 40 would be drawn into outlet piping 78 and into the further filtration means.

At this point in the operation, disposal bag 50 would be removed from separation chamber 10. In this embodiment, it is envisioned that separation chamber 10 would be mounted on a fulcrum. With inlet sleeve 55 and outlet sleeve 56 secured, they would be maneuvered inwardly through inlet port 34 and outlet port 40 respectively. Locking lever 27 would be released such that lid 26 could rotate freely, and the entire separation chamber 10 would be tilted such that disposal bag 50 would fall under the influence of gravity, from separation chamber 10 onto a transportation means, be it a truck or a large, lined dumpster for receipt of several disposal bags. Additionally, it will be recognized by those skilled in the art that inlet sleeve 55 and outlet sleeve 56 may be additionally secured by tape, glue, or other securing means in order to enhance the closure already provided by the tie-off strings 60. The only caveat associated with the securing of inlet sleeve 55 and outlet sleeve 56 is that the securing means not violate the integrity of the bagged material such that there would be leakage of hazardous particulate matter to the ambient atmosphere.

It will be recognized by those skilled in the art that there will be additional ways of removing disposal bag 50 from separation chamber 10 including the vertical lifting of the bag from separation chamber 10 by means of the plurality of U-shaped straps 57.

With respect to the operation of the system, the wetting collar 72, in alignment with inlet conduit 70 and inlet conduit 34 on lid 26 is designed to impregnate the particulate matter with water or other encapsulant in order to aid in its gravitational settling in separation chamber 10 and to prevent particulate matter from gaining access to the ambient atmosphere. The regulation of water or encapsulant through wetting collar 72 is dictated by the size of the particulate matter and its volume in the gaseous airstream and, therefore, is a parameter to be dictated to the operator based on those quantities.

Vacuum conduit 42 which aides in the maintenance of disposal bag 50 in an expanded position is preferably secured to the upper circumference of outlet piping 78 and angled downstream so as to prevent the accumulation of particulate matter in vacuum conduit 42 as such might be the case if vacuum conduit 42 were secured to the lower circumference of outlet piping 78. Further, it will be recognized by those skilled in the art that the embodiment disclosed herein, contemplates an inlet conduit in a vertical position and an outlet conduit in a horizontal position. The position of the outlet conduit is dictated by the need to use the volumetric capacity of disposal bag 50 to its fullest capacity. Therefore, the outlet conduit should be located proximate to the top 53 of disposal bag 50. The relative positions of the inlet conduit and the outlet conduit should be designed so as to permit the particulate matter in the gaseous airstream the opportunity to accumulate under the influence of gravity in disposal bag 50. Close proximity of the inlet conduit and the outlet conduit in a relatively small sized bag would permit the opportunity for fly by the particulate matter in the gaseous airstream, in other words, the particulate matter would not have the opportunity to settle under the influence of gravity to its fullest extent, but rather, would enter by means of the inlet conduit and exit the outlet conduit with substantial particulate matter still in the air-stream. The dimensions of the separation chamber and disposal bag as disclosed in this preferred embodiment are approximately four feet in diameter and eight feet in height; however, much larger chambers and disposal bags could be designed using Applicant's concept without departing from the spirit and scope of the invention. Indeed, a large disposal bag, having multiple inlet ports, is within the scope and spirit of the present invention and would permit the operator to secure such a disposal bag within a conventional dumpster fashioned with a removable lid and perforated inner wall in order to permit the operator to operate several vacuuming stations simultaneously or selectively fill one large disposal bag, a section at a time, and then seal the disposal bag in the manner described herein and drive the dumpster to a disposal site for the disposal of a single large disposal bag.

Applicant's use of the separation chamber and disposal bag in the system as shown, permits the Applicant to establish a negative pressure throughout the system in order to prevent any leakage to the outside ambient atmosphere and, in fact, the design of the system would create an inwardly flow into the system should any leak occur.

Applicant's use of the separation chamber and disposal bag as shown permits the operation of vacuuming or clean up of hazardous waste in particulate form in a more efficient manner and removes more particulate matter in an efficient manner before the gaseous airstream and remaining minute particular matter is subjected to the series of additional filtration steps. Further, Applicant's design of the separation chamber and disposal bag permits the compacting of the particulate matter so that fewer containers are required to contain the hazardous particulate matter. This is particularly important with respect to the exposure of workers and operators to hazardous material. In the past, the particulate matter removed from the first collection chamber in the vacuum truck was bagged and handled by several laborers. These men were required to wear protective clothing and respiration devices in handling the material. With the present disclosure, only those laborers associated with the vacuum and pulverizing process require protective clothing and respirator apparatus. Operators securing and dumping disposal bag 50 from separation chamber 10 are not required to wear such protective clothing and respirators and, in fact, far fewer men are needed to handle a larger volume of hazardous particulate material.

While the present invention has been described in connection with the exemplary embodiment thereof, it will be understood that many modifications will be apparent to those of ordinary skill in the art and this application is intended to cover any adaptations or variations thereof. Therefore, it manifestly intended that this invention be limited only by the claims and the equivalents thereof.

I claim:

1. Process for collecting and disposing of hazardous waste in a particulate form in a negative pressure system comprising:

a. pulverizing or grinding of the hazardous waste to achieve particulate form;

b. introducing said hazardous waste in said particulate form into a gaseous airstream under negative pressure;

c. transporting said gaseous airstream and particulate matter to filtration means and wetting said particulate matter;

d. introducing said gaseous airstream and wetted particulate matter into a first filtration means comprising a separation chamber having disposed therein, a self-contained disposal bag for the gravitational settling of particulate matter;

e. discharging said gaseous airstream and remaining particulate matter from said separation chamber;

f. introducing said gaseous airstream and remaining particulate matter into subsequent filtration means for filtration to desired particle size;

g. disconnecting inlet port to said first filtration means and securing said inlet sleeve of said disposal bag by said tying means after collecting said particulate matter;

h. disconnecting said outlet means from said separation chamber and securing said outlet sleeve of said disposal bag by said tying means;

i. removing said disposal bag from said separation chamber for disposal;

j. replacing said disposal bag in said separation chamber;

k. repeating steps a through j.

2. Separation chamber for use in a negative pressure system for the collection of particulate matter in a gaseous airstream comprising:

a first chamber defined by an impervious outer wall and an impervious bottom wall secured to said outer wall and an impervious top wall removably secured to said outer wall;

a second chamber defined by a perforated inner wall and bottom wall concentric with said outer wall thereby defining an annular space therebetween, said second chamber having an open top, said second chamber being foraminous in design and being secured within said first chamber;

an admitting means and a discharging means comprising a means for introduction of said gaseous airstream and particulate matter into said first chamber and said second chamber, said admitting means comprising an inlet port external to said first chamber and said second chamber positioned in said impervious top wall of said first chamber and disposed so as to communicate with said second chamber, said discharging means comprising an outlet port external to said first chamber and said second chamber and positioned on said impervious outer wall of said first chamber, proximate to said impervious top wall of said first chamber and in communication with said second chamber;

a collection means disposed within said second chamber and supported by said second chamber, said collection means comprising a resilient, impervious disposal bag having an inlet means in alignment with said admitting means to said separation chamber and an outlet means, in alignment with said discharge means to said separation chamber, said inlet means and said outlet means on said collection means also comprising a resilient impervious material;

a communication means comprising a conduit communicating with said annular space defined between said first chamber and said second chamber and said discharge means.

3. A separation chamber in accordance with claim 2 wherein said inlet means on said collecting means comprises a resilient impervious sleeve extendable through said inlet port of said admitting means and cuffed about same.

4. A separation chamber in accordance with claim 2 wherein said outlet means on said collecting means comprises a resilient impervious sleeve extendable through said inlet port of said discharge means and cuffed about same.

5. A separation chamber in accordance with claim 2 wherein said collecting means has attached to said inlet means and said outlet means, a means for securing said inlet means and said outlet means in a closed position subsequent to the collection of said particulate matter, said securing means comprising tie strings.

6. A collection means for the collection and disposal of particulate matter in an air stream, said collection means comprising;

a chamber defined by a resilient, impervious sidewall having secured thereto a resilient, impervious topwall and a resilient, impervious bottom wall, an admitting means and a discharge means secured to a chamber of said collection means, said admitting means and discharge means being of resilient, impervious material, said admitting means into said chamber comprising an impervious, resilient sleeve for receiving said air stream and particulate matter into said chamber, said admitting means positioned on said impervious, resilient top wall, said discharge means comprising an impervious, resilient sleeve for discharging said air stream and remaining particulate matter from said chamber, said discharge means positioned on said impervious, resilient sidewall proximate to said impervious, resilient topwall permitting heavier particulate matter to settle in said chamber.

7. A collection means in accordance with claim 6 wherein said admitting means comprises an impervious, resilient sleeve secured to said impervious, resilient topwall of said chamber of said collection means, said discharge means comprising an impervious resilient sleeve secured to said sidewall of said chamber of said collection means proximate to said topwall, each of said admitting and discharging means having a securing means for securing said admitting means and discharge means in a closed secured position.

8. A collection means in accordance with claim 6 wherein said admitting means and discharge means when secured in a closed position provide for a sealed chamber containing said particulate matter for disposal.

* * * * *